Patented Dec. 3, 1946

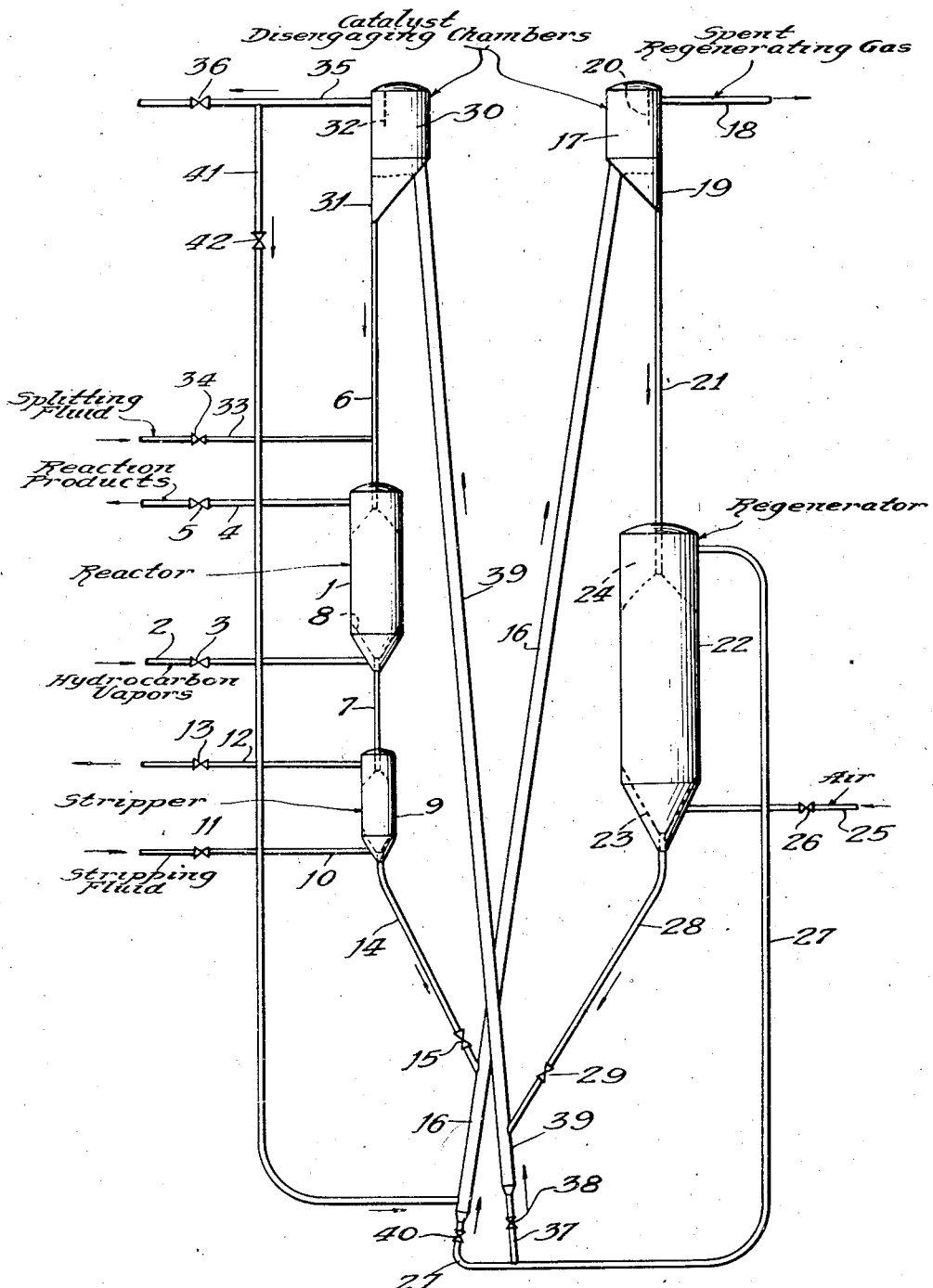

2,411,996

UNITED STATES PATENT OFFICE 2,411,996

METHOD FOR CATALYTIC CONVERSION

Louis S. Kassel, Riverside, Ill., assignor to Universal Oil Products Company, Chicago, Ill., a corporation of Delaware Application April 12, 1944, Serial No. 530,643

2 Claims. (Cl. 196—52)

This invention relates to a method for conducting catalytic conversions and more particularly to a method for converting hydrocarbons by contact with suitable conversion catalysts.

The invention is concerned with a method of conducting conversion reactions which may advantageously be employed in various processes for the conversion of hydrocarbons. Among the several processes to which the invention may be applied are catalytic cracking of hydrocarbon oil, catalytic reforming of gasoline boiling range materials, catalytic aromatization of hydrocarbons, dehydrogenation of dehydrogenatable hydrocarbons, and similar reactions for the conversion of hydrocarbons.

The invention although adaptable for use in the above and similar reactions is especially suitable for use in the process for catalytically cracking higher boiling hydrocarbon oils to form motor fuels of high antiknock rating.

One object of the present invention is to provide a method of conducting catalytic conversions in which catalyst, in the form of solid particles is passed successively through the conversion zone and regeneration zone in continuously moving beds.

Another object of the invention is to provide a catalytic conversion system employing a moving catalyst bed in which the attrition of the catalyst and the erosion of processing equipment is held to a minimum.

Another object of the invention is to provide a method of conducting catalytic conversions by means of which equipment of a given size may be made to process a large quantity of charging material without sacrificing product yields or quality.

Another object of the invention is to provide a catalytic conversion system in which the heat of regeneration supplies a substantial portion of the heat of reaction.

Another object of the invention is to provide a system for the conversion of hydrocarbons wherein the utility requirements are held to a minimum.

In one embodiment the invention concerns a method of converting hydrocarbons which comprises contacting said hydrocarbons in a zone maintained at conversion conditions with a moving bed of catalyst, continuously introducing catalyst to the upper end of said zone and continuously removing contaminated catalyst from the lower end of said zone, continuously introducing said contaminated catalyst to the upper end of a regeneration zone, continuously removing regenerated catalyst from the lower end of said regeneration zone, introducing oxygen containing gas under pressure to said regeneration zone and contacting it therein with a moving bed of catalyst to remove the contamination therefrom by combustion and employing the resultant flue gas with no increase in pressure to transfer the regenerated catalyst from a point below said regeneration zone to a point above said conversion zone, and to transfer the contaminated catalyst from a point below said conversion zone to a point above said regeneration zone.

In a more limited embodiment the transfer of catalyst by the flue gas from a point below the regeneration zone to a point above the conversion zone and from a point below the conversion zone to a point above the regeneration zone is conducted in substantially straight lines.

Suitable catalysts and conditions for the various conversion reactions which come within the scope of the invention are well-known in the art and will not be described in detail herein. However, to more clearly illustrate the advantages which may be obtained from the use of the present invention the accompanying diagrammatic drawing will be explained in connection with a catalytic cracking process.

Referring to the drawing, numeral 1 denotes the reactor to which vaporous hydrocarbons are charged through conduit 2 and valve 3. Reactor 1 when employed in a process for the cracking of a heavy Mid-Continent gas oil will be operated at temperatures within the range of about 750 to 1050° F. and at pressures of from about atmospheric to slightly superatmospheric. The catalyst employed may be formed of granular particles and may be composed of various natural occurring clays or synthetic silica-alumina composites made, for example, by the process described in U. S. Patent No. 2,229,353. Besides silica-alumina, the catalyst may also include other oxides, for example, oxides of magnesium, zirconium, and titanium. Very excellent results have been obtained employing a spherical shaped catalyst made by precipitating spheres of hydrated silica and impregnating them with alumina by soaking them successively in an aqueous solution of aluminum sulfate and in an alkaline precipitant. The spheres are then washed, aged and dried.

Although the preferred range of catalyst particle size is between about $\frac{1}{16}$ to $\frac{1}{8}$ inch average diameter the invention includes within its scope the use of larger and smaller size catalyst particles. The main considerations in the selection of size are the allowable pressure drop through the catalyst beds in the various contacting vessels and the ability of the carrying gases to transport the catalyst between the different vessels.

The reaction products from reactor 1 are conducted through conduit 4 and valve 5 to suitable separating and recovery equipment not shown. Catalyst is introduced to reactor 1 by means of conduit 6 and withdrawn therefrom by conduit 7. Within the lower portion of the reactor is placed a cone-shaped member 8 which may consist of a perforated plate or screen which serves as a distribution means for the incoming reactant stream. Inlet conduit 6 for supplying the regenerated catalyst to the reactor extends some distance below the upper head of the reactor to provide a separation space for the reaction products leaving the catalyst bed.

Below reactor 1 and connected thereto by conduit 7 is stripper 9 through which the catalyst particles are passed in contact with a suitable stripping fluid, such as steam, flue gases, or other inert material to remove vaporizable contaminating materials from the catalyst to prevent their loss by combustion in the regeneration zone. Stripper 9 is similar in construction to reactor 1 and is supplied with a stripping fluid introduced by means of conduit 10 and valve 11. The stripping fluid plus any materials removed from the catalyst is withdrawn through conduit 12 and valve 13 and directed to suitable recovery equipment not shown. The stripped catalyst is withdrawn from the bottom of stripper 9 by means of conduit 14 controlled by valve or adjustable orifice 15. The catalyst passing through valve 15 is commingled in conduit 16 with a carrying gas produced as will hereinafter be described, and passes therewith into disengaging chamber 17. The catalyst particles are separated from the carrying gas in chamber 17, the gas leaving the system through conduit 18 and the catalyst particles falling to the bottom or hopper section 19 of the disengaging chamber. A baffle plate 20 is provided in disengaging chamber 17 to prevent catalyst particles from entering conduit 18 and being removed thereby from the system. The contaminated catalyst flows from chamber 17 by means of conduit 21 into regenerator 22. Regenerator 22 is similar in construction to the reactor and stripper vessels being provided with a distribution member 23 and a separation space 24 for effluent gases. Air is supplied to the regenerator by means of conduit 25 controlled by valve 26.

The temperature maintained in regenerator 22 will be higher than the temperature maintained in reactor 1. The magnitude of this difference will vary with the charging stock to be converted and the particular product which may be desirable. In general, however, this differential will vary from about 50 to 150° F. The air supplied to regenerator 22 removes the contamination from the catalyst by combustion and the resultant flue gas is withdrawn from the regenerator by means of conduit 27 and may be diverted to conduits 16 and 39 respectively by means of valve 40 and conduit 37 and valve 38. The regenerated catalyst is removed from the regenerator by means of conduit 28 controlled by valve or adjustable orifice 29. The catalyst passing through valve 29 is commingled with flue gas passing through conduit 39 and is transported thereby to catalyst disengaging chamber 30 wherein the catalyst is separated from the flue gas. The flue gas is withdrawn from chamber 30 by means of conduit 35 and may be removed from the system through valve 36 or it may be directed by means of conduit 41 and valve 42 to conduit 16 to transport contaminated catalyst withdrawn from the reactor to disengaging chamber 17 as has already been described. In chamber 30 the catalyst particles fall by gravity to hopper section 31 wherefrom they pass by means of conduit 6 into reactor 1, thus completing the cycle. Chamber 30 like chamber 17 may be provided with a baffle 32 which functions to substantially prevent catalyst particles from being withdrawn from the chamber by means of conduit 35.

The pressure in reactor 1 is normally higher than in disengaging chamber 30. In order to prevent reaction products from flowing up through conduit 6 into chamber 30 and ultimately being lost with the spent regenerating gas, a stream of splitting fluid is provided. This stream enters conduit 6 by valve 34 and line 33. The quantity of the splitting stream is regulated so that the pressure at the junction of line 33 and conduit 6 is higher than that in reactor 1. The splitting stream therefore flows away from the junction in both directions, and provides a positive seal against mixing of reaction products and regeneration gas. This splitting stream may be any inert gas or vapor, such as nitrogen, helium or steam. As a practical matter, steam is preferred on economic grounds.

The following discussion of pressure gradients is supplied in order to clarify the method of operation. The air which enters the process by conduit 25 and ultimately leaves as regenerating gas by conduit 18 can take any one of three paths through the plant. It can flow up through regenerator 22 and conduit 21 into chamber 17 and thence out through line 18. It can flow through the lower conical section of regenerator 22 and the distribution section 23 into conduit 28 and thence by valve 29, conduit 39, chamber 30, conduits 35, 41 and 16 and chamber 17 to line 18. Or it can take the desired path through regenerator 22, conduit 27, conduits 37 and 39, chamber 30, conduits 35, 41 and 16 and chamber 17 to line 18. The amount of air which takes the first undesired path is made small by making conduit 21 of great enough height and small enough diameter so that the frictional pressure drop of gas flow through the catalyst mass in this conduit provides an effective flow resistance. The quantity of air which takes the second undesired path is likewise made small by provision of sufficient resistance in conduit 28. The major part of the air stream is therefore constrained to take the desired path.

A portion of the stripping fluid will likewise flow down through conduit 14, and here again this undesirable flow is minimized by proper design of conduit 14.

Any of these undesired flows could be completely prevented by the use of a splitting stream such as is shown in conduit 6. In most cases, however, this would not be particularly advantageous.

From the drawing it can readily be seen that the only conduits carrying high velocity catalyst particles conduct them in a substantially straight line flow which, of course, will limit erosion of the line and attrition of the catalyst particles to a minimum.

In order to further illustrate the utility of the process the following example is included in this specification:

A 31.2° API heavy Mid-Continent gas oil is vaporized and introduced to reactor 1 which is maintained at an average temperature of 975° F. The catalyst used is a spherical shaped silica-alumina composite having a particle size of about $\frac{1}{16}$ inch diameter. The oil is charged at a rate equivalent to a weight hourly space velocity of 8.5 (8.5 pounds of oil per pound of catalyst in the reaction zone) and the catalyst is circulated at a catalyst to oil weight ratio of 3.2 (3.2 pounds of catalyst entering the reaction zone to each pound of oil). The resultant product contains a motor fuel having a clear ASTM octane number by the motor method of 82.5. The yield of this gasoline on a once through basis is 38.8 volume per cent of the gas oil charged. The conversion obtained based on the per cent of disappearance of the gas oil charged is 54.7.

From this example it can readily be seen that the present invention offers a process by which large quantities of charging material may be converted to a highly desirable product in relatively small and inexpensive equipment.

Also by employing the present invention very efficient and economical transfer of catalyst between the various processing zones is accomplished, the incoming regenerating air under moderate pressure supplying all the necessary lifting power.

I claim as my invention:

1. A conversion process which comprises contacting hydrocarbons with subdivided solid catalyst in a reaction zone maintained under conversion conditions, simultaneously passing an oxygen-containing gas through a mass of contaminated catalyst particles in a regenerating zone maintained at combustion temperature to burn contaminants from the catalyst particles, supplying regenerated catalyst particles by gravity to the upper portion of the reaction zone from a separating zone disposed at a higher elevation than the reaction and regenerating zones, supplying contaminated catalyst particles by gravity to the upper portion of the regenerating zone from a second separating zone disposed at a higher elevation than the reaction and regenerating zones, removing contaminated catalyst from the lower portion of the reaction zone, removing regenerated catalyst from the lower portion of the regenerating zone, transporting the withdrawn regenerated catalyst particles upwardly to the first-named separating zone in suspension in combustion gases formed in the regenerating zone, separating the regenerated particles from the combustion gases in said first-named separating zone, suspending in at least a portion of the thus separated combustion gases the contaminated catalyst removed from the lower portion of the reaction zone, passing the resultant suspension upwardly into said second separating zone and therein separating the contaminated catalyst from the combustion gases.

2. The process as defined in claim 1 further characterized in that the regenerating zone is maintained under a pressure such that the pressure of the combustion gases discharging therefrom is sufficient to overcome the flow resistance in said transportation of the catalyst, the latter being transported as aforesaid under the pressure of the regenerating zone.

LOUIS S. KASSEL.